(12) United States Patent
Hogan et al.

(10) Patent No.: US 8,479,202 B2
(45) Date of Patent: Jul. 2, 2013

(54) METHOD AND SYSTEM FOR AUTONOMIC APPLICATION PROGRAM SPAWNING IN A COMPUTING ENVIRONMENT

(75) Inventors: Natalie S. Hogan, Winchester (GB); Andrew J. E. Menadue, Winchester (GB); Thomas van der Veen, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 12/367,025

(22) Filed: Feb. 6, 2009

(65) Prior Publication Data

US 2010/0205617 A1 Aug. 12, 2010

(51) Int. Cl.
*G06F 9/46* (2006.01)

(52) U.S. Cl.
USPC ............ 718/100; 719/312; 719/318; 719/320

(58) Field of Classification Search
None
See application file for complete search history.

(56) References Cited

U.S. PATENT DOCUMENTS

| 2002/0152372 | A1 | 10/2002 | Cole et al. |
| 2003/0126335 | A1 | 7/2003 | Silvester |
| 2003/0135769 | A1* | 7/2003 | Loughran ..................... 713/310 |
| 2004/0225876 | A1* | 11/2004 | Lam ................................. 713/2 |
| 2005/0268301 | A1* | 12/2005 | Kelley et al. ................. 718/100 |

* cited by examiner

*Primary Examiner* — Emerson Puente
*Assistant Examiner* — Dong Kim
(74) *Attorney, Agent, or Firm* — Kenneth L. Sherman, Esq.; Michael Zarrabian, Esq.; Sherman & Zarrabian LLP

(57) ABSTRACT

A method and system for self-managing an application program in a computing environment, is provided. One implementation involves spawning a primary application for execution in the computing environment; the primary application monitoring status of the primary application and the computing environment resources while executing; and upon detecting a first status threshold, the primary application spawning a secondary application in the computing environment, wherein the secondary application comprises a lower functionality version of the primary application, and the primary application terminating.

17 Claims, 4 Drawing Sheets

METHOD AND SYSTEM FOR AUTONOMIC APPLICATION PROGRAM SPAWNING IN A COMPUTING ENVIRONMENT

BACKGROUND

1. Field of the Invention

The invention relates generally to application program management and in particular to application program management based computing system resources.

2. Background Information

In a typical computing environment, a computing system includes an operation system which manages computing resources (e.g., processor, memory, storage, communication bandwidth) and execution of various processes such as application programs. When running certain applications, the operating system may come under pressure from other applications that want to use resources in the computing system.

The usual result is that as the operating system attempts to manage execution of all applications given available resources, execution speed of the applications degrades. The computing system processor is loaded and the memory is swapped to a disk. If there is an application running that needs to process information by a certain time, then that application may not be able to satisfy such timing requirements. An example is an instant messaging system which may be in the midst of facilitating an important communication and the slow response time negatively impacts real-time performance of such a system.

An approach that is most commonly used to address such problems is to improve the computing system by replacing or upgrading the system or adding more computing resources. This can be costly and once the application programs manage to use the new resources the original problem re-occurs. Such approaches do not provide real-time solutions and require human intervention.

BRIEF SUMMARY

The invention provides a method and system for self-managing an application program in a computing environment. One embodiment comprises a self-managing process including: the steps of spawning a primary application for execution in the computing environment; the primary application monitoring status of the primary application and the computing environment resources while executing; and upon detecting a first status threshold, the primary application spawning a secondary application in the computing environment, wherein the secondary application comprises a lower functionality version of the primary application, and the primary application terminating.

The process may further include: the secondary application monitoring status of computing environment resources while executing; and upon detecting a second threshold status of computing environment resources, the secondary application re-spawning the primary application in the computing environment, and the secondary application terminating.

The first status threshold may represent circumstances under which the primary application may spawn the secondary application, and the second status threshold may represent the circumstances under which the secondary application may re-spawn the primary application.

The secondary application may require less numbers of resources than the primary application and/or consume less of each resource compared to the primary application. The application program includes said primary application and said secondary application, wherein the secondary application includes core functions of the primary application.

These and other features, aspects and advantages of the invention will become understood with reference to the following description, appended claims and accompanying figures.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1:
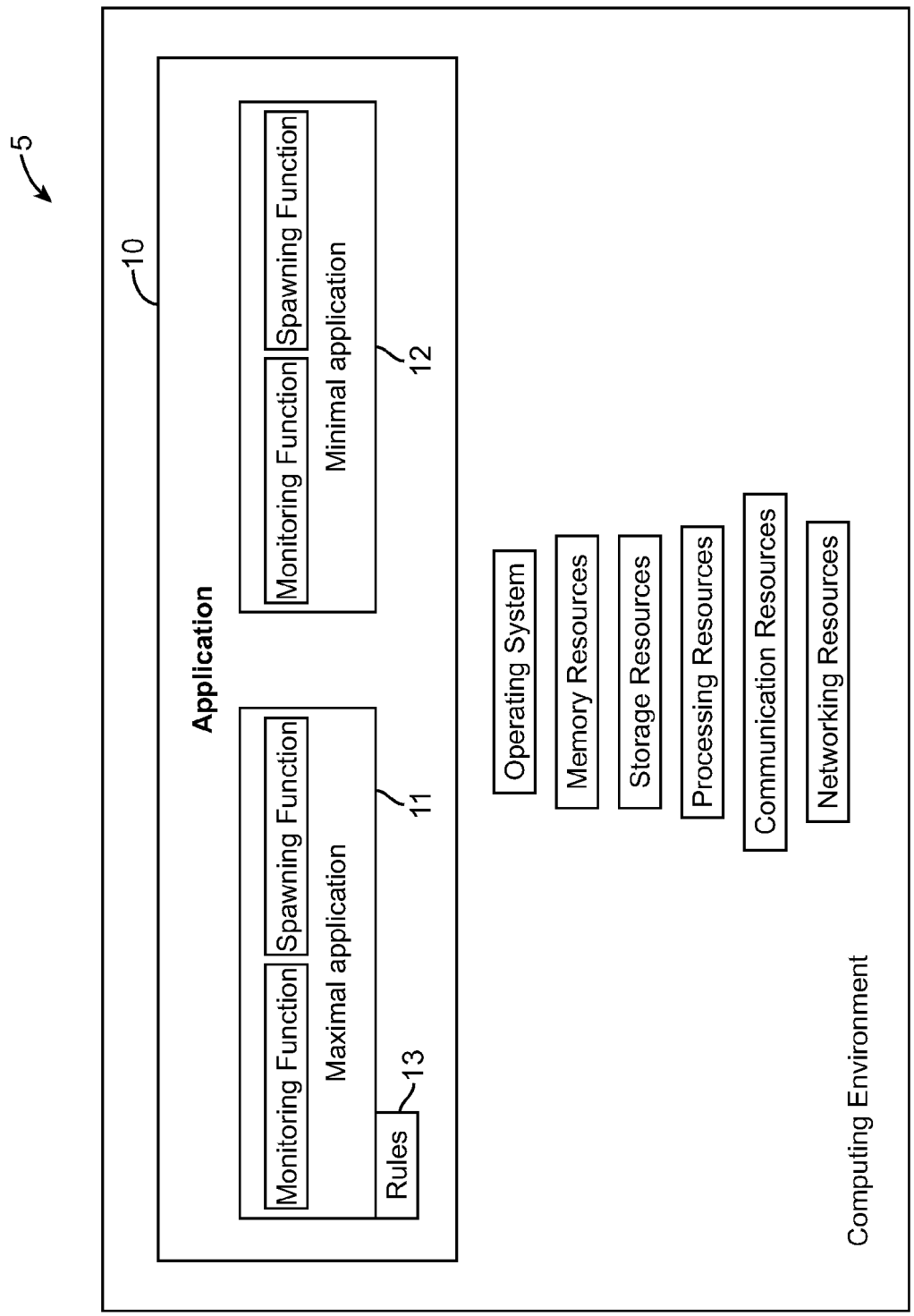
FIG. 1 shows a functional block diagram of an application program including a primary application component and secondary application component which is a reduced feature version of the primary component, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for autonomic application spawning in a computing environment under resource availability pressure. One embodiment involves a process wherein each application program detects that its response time delay has increased (degraded) to a level that is considered unacceptable, and such an application program spawns a lower functionality application program version of itself. The full functionality application program is then terminated. The lower functionality application program provides fewer functional features than the full functionality application program, utilizes fewer computing resources and executes more rapidly. As a result, the lower functionality application program enjoys a reduced response time delay. A user may then use the lower functionality application program to accomplish computing tasks.

For example, in the instant messaging computing system, a full featured instant messaging application program that detects increasing response time delay spawns a lower functionality application program version (e.g., text-only application program) of the full featured instant messaging application program. The lower functionality application program version does not include functionality that is not considered a core feature of the instant messaging computing system (e.g., text-only version application program does not include features such as graphical user interface (GUI), voice, file transmission, screen shots). A user can then continue with instant messaging using the text-only version which provides reduced response time delay then the full featured instant messaging application program, rather than tolerating a slow full featured instant messaging application program that awaits computing resources to be freed.

In one implementation of the invention, a full functionality application program (primary program) includes a monitoring module (e.g., application code) that monitors resource use either directly or indirectly by measuring response times. A reduced functionality version of the main primary is maintained such that it can be spawned to replace the main application as described. The reduced functionality version is designated as secondary program hereinafter. The operating system reserves a set of resources (e.g., memory and processor capacity) sufficient for a secondary application to be executed. This ensures that the secondary application can execute at its full speed and not be subject to resource pressure (e.g., resource unavailability) problems that other applications have created.

Once the primary program detects that a response time threshold has been reached, the main program instructs the operating system to spawn the secondary program and terminate the primary program.

Once the resource pressure is reduced below a threshold, as monitored by the secondary program, the secondary program may re-spawn the primary program, or the user may instruct the operating system to re-spawn the primary program. The secondary program is then terminated. Preferably, a delay period is introduced before the re-spawn of the primary program to avoid circular spawning because otherwise the increased resource requirements of the re-spawned primary program may trigger a response time delay increase beyond a threshold and cause a spawn of the secondary application, and so on.

FIG. 1 shows an example implementation of a system 5 including an example application program 10 according to an embodiment of the invention. The application program 10 includes two components: a primary program (maximal application 11) component and a secondary program (minimal application 12) component, as described. The maximal application 11 comprises a full featured (full functionality) application program and the minimal application 12 comprises a reduced feature (reduced functionality) version of the full featured application.

When the resources of a computing system executing the maximal application 11 component of the application program 10, are under heavy utilization (under pressure), the user can continue working with the application program 10 using the minimal application component. While the computing system is able to cope with resource demands of applications, the maximal application 11 executes. Once the computing system cannot cope with the resource demands (e.g., the application program (maximal application) detects increased response time delay beyond a threshold), then parameters are built describing the current process workload and spawning rules for returning to the original state (i.e., computing system can cope with the resource demands), are specified. The parameters describe the task that the minimal application is to take over. For example, in an instant messaging application, the task would be the name(s) of the person(s) that are being conversed with. It may also include a chat history, but that is not a necessary parameter.

The spawning rules 13 describe the circumstances under which the maximal application 11 may spawn the minimal application 12, and the circumstances under which the minimal application 12 may re-spawn the maximal application 11. Such circumstances may include: level of availability of one or more resources (e.g., response time delay of the application, amount of free memory, percentage of processor utilization, number of application programs in a processing queue, operating system operational status). Example circumstances/rules for spawning the minimal application 12 may include, for example: a measured response time is greater than 3 seconds. Example circumstances/rules for re-spawning the maximal application 11 may include, for example, in the maximal application: time since minimal spawn is greater than 5 minutes and free memory is greater than 512 MB.

The minimal application 12 is spawned based on commands from the maximal application 11 when the latter detects increased response time delay beyond a threshold. When the minimal application 12 is spawned, the minimal application 12 obtains status information about the current computing system workload and when it may be acceptable to re-spawn the maximal application 11 (such status information can be made available by the operating system at initialization of the minimal application). Once the minimal application 12 is executing, the maximal application 11 can be terminated until computing system resources are available at a level above a high threshold.

Figure 2:
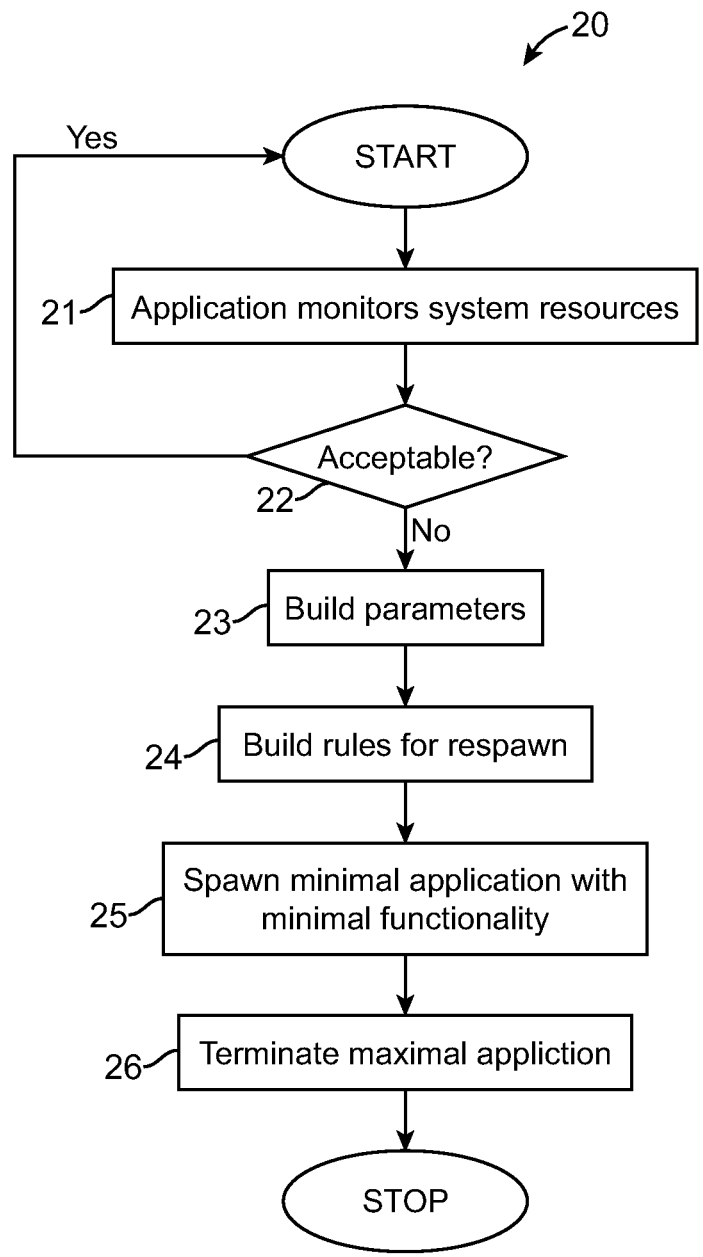
FIG. 2 shows a flowchart of a process for spawning the secondary application and terminating the primary application based on available system resources, according to an embodiment of the invention.

FIG. 2 shows a flowchart of an example process 20 implemented by the primary application (e.g., maximal application), including:

Step 21: Maximal application executing while monitoring status of the maximal application (e.g., responsiveness, etc.) and status of computing system resources against a first status threshold.

Step 22: If the status of the computing resources is an acceptable level relative to the first status threshold (e.g., availability of memory, processor, etc.), then the process proceeds back to step 21, otherwise the process proceeds to step 23.

Step 23: Build parameters. In one example, the parameters provide, as a minimum, sufficient information for the minimal application to take over and continue the operation that the maximal application was performing. For example, an instant messaging client is provided with the participants of the chat that was in progress, such as:
PARAMETERS=PARTICIPANTS(jdoe@a.com, psmithb.com).

Other parameters can also be provided, though not required. The minimal application is, by definition, minimal and as such it may be unnecessary to include code to handle non-essential parameters which may increase the resource usage of the minimal application.

Step 24: Build rules for re-spawn of the maximal application. The rules for re-spawning the maximal application can also be supplied to the minimal application. For example:
RESPAWN=(EL>5 m) && (FM>512 MB),
where EL is a token that represents the elapsed time since spawn of the minimal application and FM is a token that represents the free memory (in megabytes) in the system. The parentheses take their normal meaning of precedence indication in the expression, and the && symbol represents the logical AND operation. These are representative of logical statements in many programming languages.

Step 25: Spawn minimal application with minimal functionality.

Step 26: Terminate maximal application.

When computing system resources become available again (e.g., computing system resources are available at a level above a threshold), then the minimal application can determine whether (or when) to re-spawn (restart) the maximal application. We wish to avoid bouncing between the two versions such that the spawning rules are used to specify requirements. When the rules are met, before the minimal application version is terminated, the maximal application is restarted with information about current computing system workload.

Figure 3:
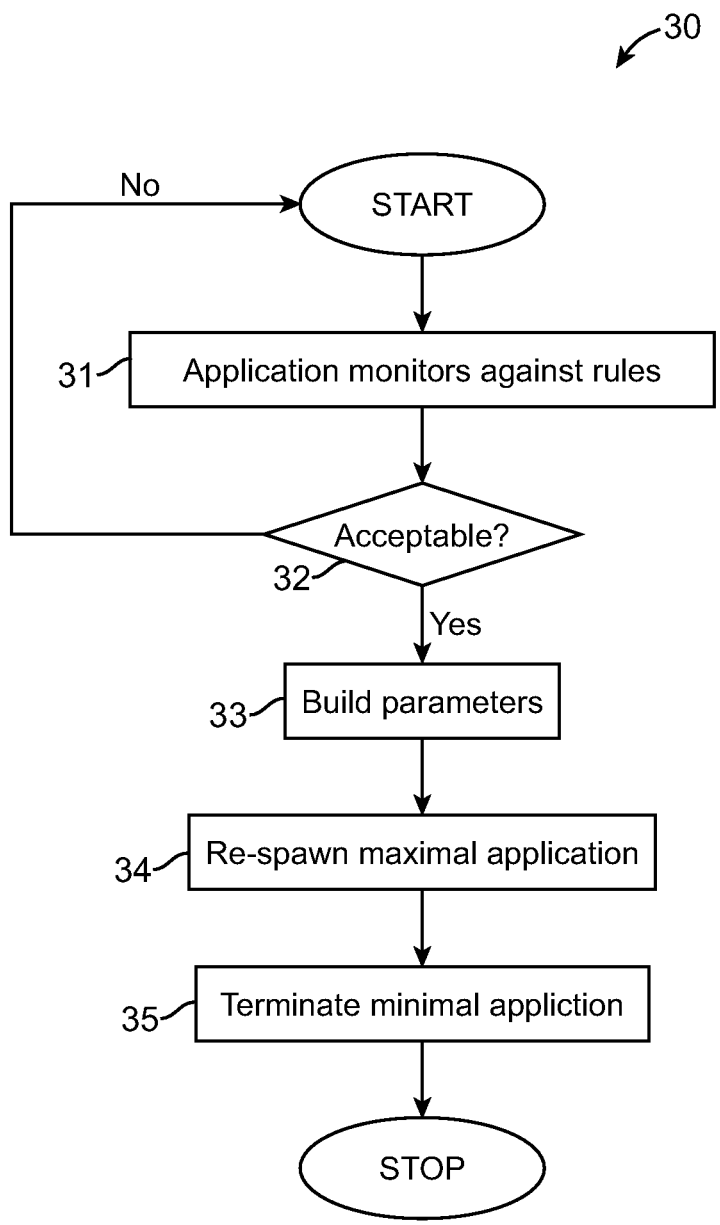
FIG. 3 shows a flowchart of a process for re-spawning the primary application and terminating the secondary application based on available system resources, according to an embodiment of the invention.

FIG. 3 shows a flowchart of an example process 30 implemented by the secondary application (e.g., minimal application), including:

Step 31: Minimal application executing while monitoring status of computing system resources against a second status threshold (e.g., said rules).

Step 32: If the status of the computing resources is an acceptable level relative to a threshold (e.g., availability of memory, processor, etc.), then the process proceeds back to step 31, otherwise the process proceeds to step 33.

Step 33: Build parameters (similar to that described above).

Step 34: Re-spawn of the maximal application.

Step 35: Terminate minimal application.

As such, the primary and second application components of the application program, allow the application program to perform autonomic computing which involves self-management based on the state of the computing environment resources. The self-management allows the application program to provide core functionality while maintaining responsiveness. This autonomic behavior allows the maximal application to continue providing the user with the ability to perform their tasks, even when the system resources do not allow the larger application to execute in a practical fashion. The spawning of the minimal application may be arranged such that the user is almost unaware of the fact that the user is interacting with a different application. This may not be necessary, but all the user may know of the smaller application is a change of typeface and the loss of some user interface menus or buttons. Similarly the re-spawn of the maximal application may be arranged to be almost imperceptible. As the "overload" situations are handled without the need to add physical resources to the machines, expenditure on hardware is delayed, with obvious cost and environmental benefits. The secondary application comprises a lower functionality version of the primary application. The secondary application requires less number of resources than the primary application and/or consumes less of each resource compared to the primary application program.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

Figure 4:
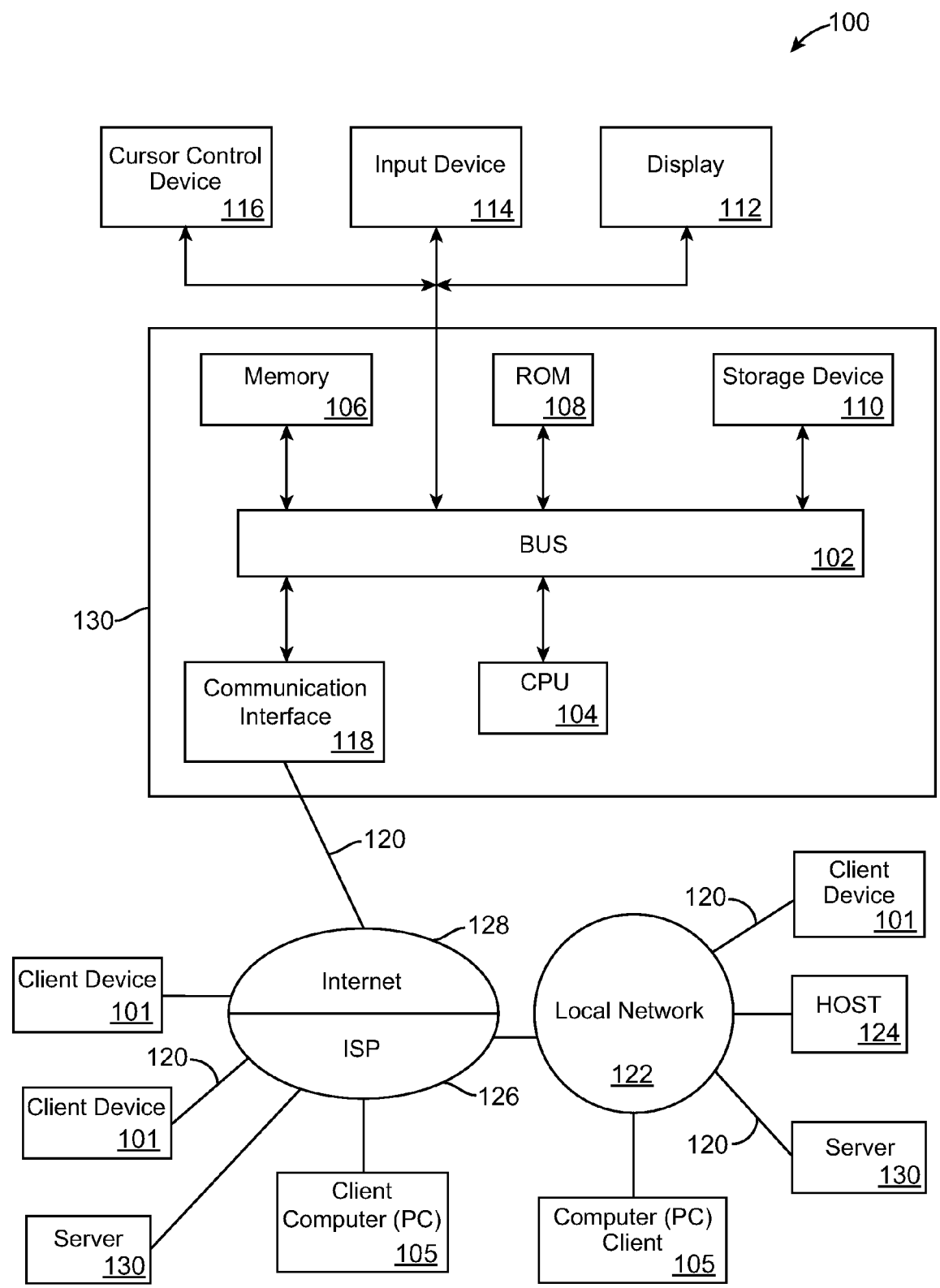
FIG. 4 shows a functional block diagram of an example computing environment implementing an embodiment of the invention.

FIG. 4 shows a functional block diagram of an example architecture of an embodiment of a system 100 configured to perform the processes described above, according to an embodiment of the invention. The system 100 includes one or more client devices 101 connected to one or more server computing systems 130. A server 130 includes a bus 102 or other communication mechanism for communicating information, and a central processing unit (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type or user input device comprises cursor control 116, such as a mouse, a trackball, or cursor direction keys for communicating direction information and command selections to the processor 104 and for controlling cursor movement on the display 112.

According to one embodiment of the invention, the functions of the invention are performed by the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the multi-core processor to perform the features of the computer system. Accordingly, such computer programs represent controllers of the computer system.

Generally, the term "computer-readable medium" as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of self-managing an application program in a computing environment, comprising:

spawning a primary application for execution in the computing environment, the primary application providing one or more core application features;

the primary application monitoring status of the primary application and a computing environment resources while executing; and upon detecting a first status threshold based on response time, the primary application spawning a secondary application in the computing environment, wherein the secondary application comprises a lower functionality version of the primary application while providing the one or more core application features of the primary application, and the primary application terminating, wherein the first status threshold represents first computing environment conditions under which the primary application may spawn the secondary application and a second status threshold represents second computing environment conditions under which the secondary application may re-spawn the primary application, wherein the second status threshold is based on availability of computing environment processing resources required by the primary application.

2. The method of claim 1 further comprising:
the secondary application monitoring status of computing environment processing resources while executing; and
upon detecting the second threshold status of computing environment processing resources, the secondary application re-spawning the primary application in the computing environment after a predetermined delay period after the secondary application is terminated.

3. The method of claim 2 wherein the computing environment processing resources comprise one or more of: available processor resources, available memory resources, available storage resources, and available communication resources.

4. The method of claim 1 wherein the secondary application requires less number of resources than the primary application and/or consume less of each resource compared to the primary application.

5. The method of claim 1 wherein the application program includes said primary application and said secondary application.

6. The method of claim 1 wherein the secondary application includes core functions of the primary application.

7. A computer program product for self-managing an application program in a computing environment, comprising a non-transitory computer usable medium including a computer readable program including program instructions, wherein the computer readable program when executed on a computer system causes the computer system to:
spawn a primary application for execution in the computing environment, the primary application providing one or more core application features;
execute the primary application while the primary application monitors status of the primary application and a computing environment resources while executing; and
upon detecting a first status threshold based on response time, the primary application spawns a secondary application in the computing environment, wherein the secondary application comprises a lower functionality version of the primary application while providing the one or more core application features of the primary application, and the primary application terminating, wherein the first status threshold represents first computing environment conditions under which the primary application may spawn the secondary application and a second status threshold represents second computing environment conditions under which the secondary application may re-spawn the primary application, wherein the second status threshold is based on availability of computing environment processing resources required by the primary application.

8. The computer program product of claim 7 further comprising program instructions wherein the:
the secondary application monitors status of computing environment processing resources while executing; and
upon detecting the second threshold status of computing environment processing resources, the secondary application re-spawns the primary application in the computing environment after a predetermined delay period after the secondary application is terminated.

9. The computer program product of claim 8 wherein the computing environment processing resources comprise one or more of: available processor resources, available memory resources, available storage resources, and available communication resources.

10. The computer program product of claim 7 wherein the secondary application requires less number of resources than the primary application and/or consume less of each resource compared to the primary application.

11. The computer program product of claim 7 wherein the application program includes said primary application and said secondary application.

12. The computer program product of claim 7 wherein the secondary application includes core functions of the primary application.

13. A system for self-managing an application program in a computing environment, comprising:
a processor coupled to memory;
a primary application including a monitoring processor function configured for monitoring status of the primary application and a computing environment resources while executing, the primary application providing one or more core application features; and
the primary application further including a spawning processor function configured such that upon detecting a first status threshold based on response time, the primary application spawns a secondary application in the computing environment, wherein the secondary application comprises a lower functionality version of the primary application while providing the one or more core application features of the primary application, and the primary application terminating, wherein the first status threshold represents first computing environment conditions under which the primary application may spawn the secondary application and a second status threshold represents second computing environment conditions under which the secondary application may re-spawn the primary application, wherein the second status threshold is based on availability of computing environment processing resources required by the primary application.

14. The system of claim 13 wherein:
the secondary application includes a monitoring processor function configured for monitoring status of computing environment processing resources while executing, and a re-spawning processor function configured such that upon detecting the second threshold status of computing environment processing resources, the secondary application re-spawns the primary application in the computing environment after a predetermined delay period after the secondary application is terminated.

15. The system of claim 13 wherein the secondary application requires less number of resources than the primary application and/or consume less of each resource compared to the primary application.

16. The system of claim 13 wherein the application program includes said primary application and said secondary application.

17. The system of claim 13 wherein the secondary application includes core functions of the primary application.

* * * * *